United States Patent
He et al.

(10) Patent No.: US 10,200,667 B2
(45) Date of Patent: Feb. 5, 2019

(54) CREATING THREE DIMENSIONAL GRAPHICS DATA

(71) Applicant: KONINKLIJKE PHILIPS N.V., Eindhoven (NL)

(72) Inventors: Darwin He, Shanghai (CN); Li Hong, Veldhoven (NL); Philip Steven Newton, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 311 days.

(21) Appl. No.: 14/264,108

(22) Filed: Apr. 29, 2014

(65) Prior Publication Data

US 2015/0381961 A1    Dec. 31, 2015

Related U.S. Application Data

(63) Continuation of application No. 12/444,704, filed as application No. PCT/IB2007/054084 on Oct. 8, 2007, now Pat. No. 8,711,203.

(30) Foreign Application Priority Data

Oct. 11, 2006 (EP) .................................. 06301037

(51) Int. Cl.
*H04N 13/275* (2018.01)
*H04N 13/189* (2018.01)
(Continued)

(52) U.S. Cl.
CPC ......... *H04N 13/189* (2018.05); *G11B 27/034* (2013.01); *H04N 5/85* (2013.01);
(Continued)

(58) Field of Classification Search
None
See application file for complete search history.

(56) References Cited

U.S. PATENT DOCUMENTS 6,111,979 A * 8/2000 Katto ...................... G06T 9/001
382/154
6,407,741 B1 * 6/2002 Morein .................... G06T 9/00
345/422
(Continued)

FOREIGN PATENT DOCUMENTS

EP          0600601 B1   1/1999
JP       2000078611 A    3/2000
(Continued)

OTHER PUBLICATIONS

"Preliminary Requirements for 3D Video Support in MPEG", 59, MPEG Meetings Mar. 1, 2002-Mar. 15, 2002; JEJU; (Motion Picture Expert Group or ISO/IEC JTC1/SC29/WG11); No. N4679, Apr. 22, 2002.
(Continued)

*Primary Examiner* — Mohammed S Rahaman

(57) ABSTRACT

A recorder creating an encoded data stream comprising an encoded video stream and an encoded graphics stream, the video stream comprising an encoded 3D (three-dimensional) video object, and the graphics stream comprising at least a first encoded segment and a second encoded segment, the first segment comprising 2D (two-dimensional) graphics data and the second segment comprises a depth map for the 2D graphics data. A graphics decoder decoding the first and second encoded segments to form respective first and second decoded sequences. Outputting the first and second decoded sequences separately to a 3D display unit. The 3D display unit combining the first and second decoded sequences and rendering the combination as a 3D graphics image overlaying a 3D video image simultaneously rendered from a decoded 3D video object decoded from the encoded 3D video object.

13 Claims, 6 Drawing Sheets

(51) Int. Cl.

| | | |
|---|---|---|
| *H04N 13/15* | (2018.01) | |
| *H04N 13/156* | (2018.01) | |
| *H04N 13/161* | (2018.01) | |
| *H04N 13/194* | (2018.01) | |
| *H04N 13/183* | (2018.01) | |
| *H04N 13/293* | (2018.01) | |
| *H04N 13/324* | (2018.01) | |
| *H04N 5/85* | (2006.01) | |
| *H04N 9/804* | (2006.01) | |
| *G11B 27/034* | (2006.01) | |
| *H04N 7/015* | (2006.01) | |
| *H04N 21/41* | (2011.01) | |
| *H04N 21/426* | (2011.01) | |
| *H04N 5/775* | (2006.01) | |
| *H04N 19/597* | (2014.01) | |
| *H04N 13/00* | (2018.01) | |

(52) U.S. Cl.
CPC ........... *H04N 7/015* (2013.01); *H04N 9/8042* (2013.01); *H04N 13/15* (2018.05); *H04N 13/156* (2018.05); *H04N 13/161* (2018.05); *H04N 13/183* (2018.05); *H04N 13/194* (2018.05); *H04N 13/275* (2018.05); *H04N 13/293* (2018.05); *H04N 13/324* (2018.05); *H04N 21/4135* (2013.01); *H04N 21/42653* (2013.01); *H04N 5/775* (2013.01); *H04N 19/597* (2014.11); *H04N 2013/0077* (2013.01)

(56) References Cited

U.S. PATENT DOCUMENTS

| | | | |
|---|---|---|---|
| 6,882,346 | B1 | 4/2005 | Lefebvre et al. |
| 2005/0068319 | A1* | 3/2005 | Kim .................. G06T 15/40 |
| | | | 345/421 |
| 2005/0185711 | A1 | 8/2005 | Pfister et al. |
| 2007/0057969 | A1 | 3/2007 | Mc Crossan et al. |

FOREIGN PATENT DOCUMENTS

| | | | |
|---|---|---|---|
| JP | 2004274125 A | 9/2004 | |
| WO | 0046753 A1 | 8/2000 | |
| WO | 2004071102 A1 | 8/2004 | |
| WO | 2005006747 A1 | 1/2005 | |
| WO | WO2005006747 A1 * | 1/2005 | ............. H04N 9/641 |
| WO | 2005114998 A1 | 12/2005 | |

OTHER PUBLICATIONS

"Application Definition Blu-Ray Disc Format BD-J Baseline Appication and Logial Model Definiation for BD-ROM", XP007904998, Mar. 1, 2005, pp. 1-45

Schreer et al, "3D Video Communication: Algorithms, Concepts and Real-Time Systems in Human Centered Communication", Chapter 2, C Fehn, Jul. 2005, 17 Pages.

* cited by examiner

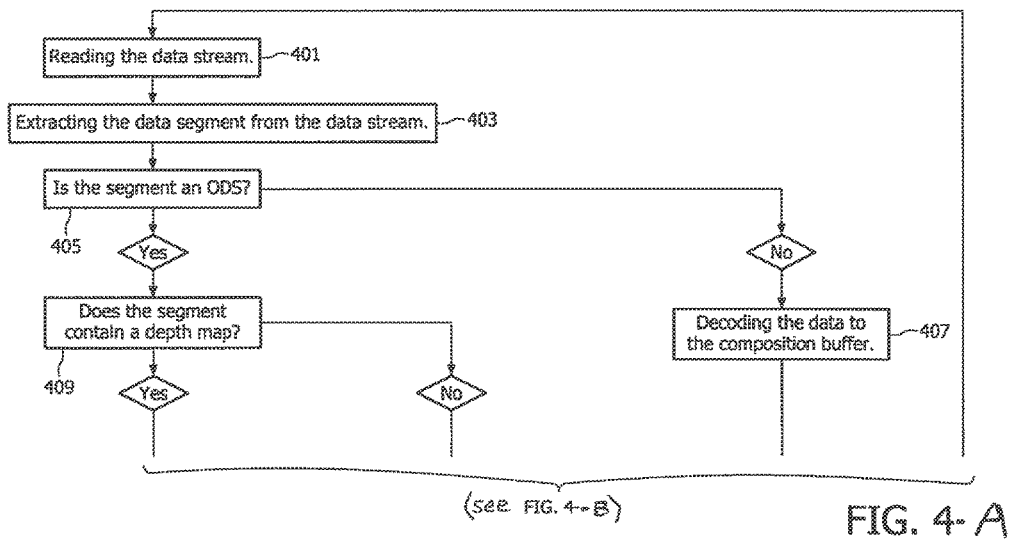
FIG. 4-A

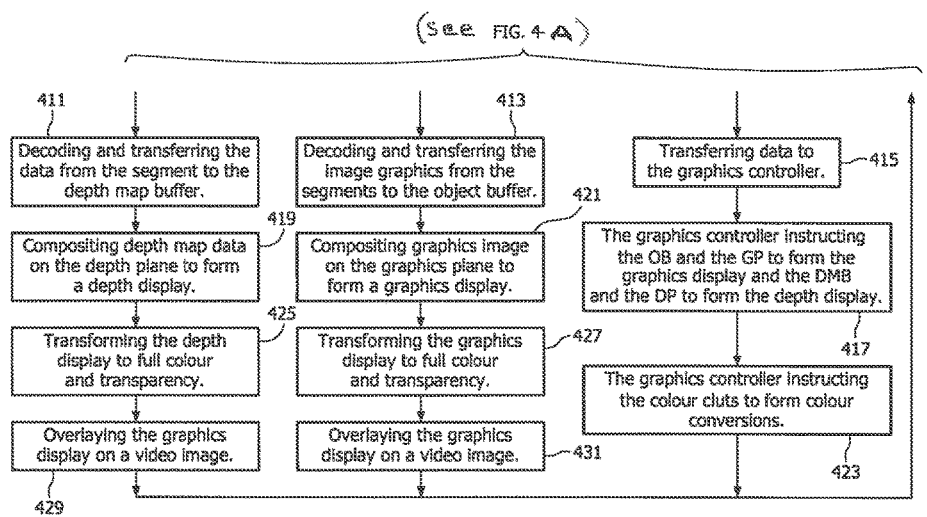
FIG. 4-B

CREATING THREE DIMENSIONAL GRAPHICS DATA

The present invention claims, pursuant to 35 USC 120, priority to and the benefit of, the earlier filing date of that patent application entitled "Creating Three Dimensional Graphics Data," filed on Apr. 8, 2009 and afforded Ser. No. 12/444,704, which claimed priority as a National Stage filing of that patent application filed on Oct. 8, 2007, and afforded serial number PCT/IB2007/54084, which claimed priority to that patent application filed on Oct. 11, 2006 and afforded serial number EP 06301037.5, the contents of all of which are incorporated by reference, herein.

The present invention relates to a method for creating a data stream, which can be decoded by a decoder to form a three-dimensional graphics stream that can be displayed in three-dimensions on a screen of a display. The invention also relates to a corresponding decoding method, decoder, computer program product, recording media, set-top box, digital video disc (DVD) player and digital television.

Graphical display devices, such as computer displays or televisions are commonly used for displaying two or three-dimensional objects to a user of the device. Typically an audio/visual (AV) clip to be displayed to the user consists of a video stream, at least one audio stream and a graphics stream. The video stream corresponds to a moving picture of a film, the audio stream corresponds to the audio of the film and the graphics stream typically corresponds to subtitles or menu data of the film.

The introduction of three-dimensional (3D) video creates new opportunities for creative content creators, for instance in the area of movie publishing—3D video is experiencing a revival with the introduction of new auto-stereoscopic displays and improvement of existing techniques, such as monitors with high refresh rates.

The Blu-ray Disc (BD) is a disc format meant for high-density storage of high-definition (HD) video and data. The Blu-ray standard was jointly developed by a group of consumer electronics and personal computer (PC) companies called the Blu-ray Disc Association (BDA).

FIG. 1 shows the principal elements of a graphics system, which in this case operates in accordance with the Blu-ray standard. In FIG. 1 there is shown a BD 101, which in this description shall be referred to as a BD-ROM 101. The BD-ROM 101 is adapted for storing data, such as 3D video clips. Then there is shown a BD player 103 also known as a playback unit, which is capable of decoding data from the BD-ROM 101. The BD player 103 supports at least one of the following audio and video codecs: MPEG-2, MPEG-4 and H.264/AVC. The BD player 103 may also be arranged to record data onto the BD-ROM 101. The player 103 is connected to a display unit 105 comprising a screen. The display unit 105 in this case is a television 105.

FIG. 2 shows one example of a block diagram of a graphics decoder 200, which can be used to decode 2D or 3D graphics data streams. In this example the decoder 200 is physically located in the BD player 103.

The data stream that consists of data segments first arrives at a coded data buffer 201. The data stream comprises the following functional segment types: a presentation composition segment (PCS), composition refers to multiple things being combined to form a single thing, a window definition segment (WDS), a palette definition segment (PDS), an object definition segment (ODS) and an end of display set segment (END).

The ODS is a functional segment for defining a graphics object. The graphics object is located in a field called object_data_fragment. The ODS also comprises other fields, for instance an object_ID field used for identifying the graphics object.

The PDS is a functional segment for defining a palette used for color conversion. The PDS comprises data showing pixel values and combinations of pixel codes of 1 to 255. A pixel value referred to here is made up of a transparency (T value), a red color difference component (Cr value), a blue color difference component (Cb value) and a luminance component (Y value).

The WDS is a functional segment for defining an area on the graphics plane. The meaning of the graphics plane will be explained later. A rectangular area on the graphics plane is called a window, which is defined by the WDS.

The END is a functional segment indicating that the transmission of the data set is complete, i.e. that all functional segments relating to a display set have been decoded.

The PCS is a functional segment for compositing a screen that can be synchronized with a moving image. The PCS also defines the appearance of a graphics display on the graphics plane.

The number of different segment types in the data stream may vary depending on the transmitted graphics object. For instance, there can be several ODS, but only one PCS. The different segment types are linked together by using different identifiers, such as an object identity, a window identity or a palette identity, in the segments. One graphics stream further forms a display set. International patent publication WO2005/006747, for instance, discloses more details on these functional segments.

A graphics processor 203 extracts the data segments from the coded data buffer at time instants defined by system time-stamps associated with the data segments to create a data sequence. When the PCSs, PDSs and WDSs arrive at the graphics processor, they are decoded to a composition buffer 205. When the ODSs arrive at the graphics processor 203, the graphics processor decodes the ODSs to obtain uncompressed graphics having index colors, and transfers the uncompressed graphics to an object buffer 207.

A graphics controller 209 is responsible for compositing graphics images onto the graphics plane 211 in accordance with the description in the PCS. The graphics controller also provides, based on the data fields in the PCS, information related to cropping graphics objects that are in the object buffer 207. Thus, the functional segments are decoded and a graphics object is composited onto the graphics plane 211 inside a bounding rectangular area called a window.

A CLUT (Color Look-Up Table) block 213 performs a color conversion on the uncompressed graphics obtained from the object buffer 207 based on information obtained from the graphics controller 209. For this purpose the graphics controller 209 is also connected to the CLUT block 213.

The graphics stream is then output to a display 105.

However, introducing 3D video and 3D graphics into such graphics systems usually requires changes to MPEG standards for the video and also changes in the graphics system. This is the case, for instance for including 3D graphics in Blu-ray graphics system. Such changes are cumbersome.

Therefore, it is desirable to find a simple solution to include 3D graphics into the existing graphics systems without the need to change the existing system specifications.

The invention aims at achieving the above object.

According to a first aspect of the invention there is proposed a method in a graphics system for creating a data stream allowing to form three-dimensional graphics data, the data stream consisting of segments. The method comprises:

forming the data stream comprising at least first and second segments, the first segment comprising a two-dimensional graphics object and the second segment comprising information so related to the two-dimensional graphics object that it allows to obtain the three-dimensional graphics data by combining at least first and second data sequences, obtained by a decoder from the first and second segments, respectively.

One advantage of an embodiment of the present invention is that 3D graphics data can be added to a graphics system without changing the system standard.

According to a second aspect of the invention there is provided a method in a graphics system for decoding a data stream, wherein the data stream comprises at least first and second segments, the first segment comprising two-dimensional graphics data and the second segment comprising information relating to the two-dimensional graphics object, the method comprising:

receiving the data stream;
forming a first decoded data sequence from the first segment and a second decoded data sequence from the second segment; and
outputting the first decoded data sequence and the second decoded data sequence to a display unit for rendering a three-dimensional graphics data by combining the first decoded data sequence and the second decoded data sequence.

According to a third aspect of the invention there is provided a computer program product comprising instructions for implementing the method according the first and second aspects of the invention when loaded and run on computer means of the graphics system.

According to a fourth aspect of the invention there is provided a recording media having instructions stored therein for implementing the steps of a method according to the first and second aspects of the invention when loaded and run on computer means of the recording media.

According to a fifth aspect of the invention there is provided a decoder for decoding a data stream, wherein the data stream comprises at least first and second segments, the first segment comprising two-dimensional graphics object and the second segment comprising information related to the two-dimensional graphics object, the decoder comprising:

a receiver for receiving the data stream;
a processor for forming a first decoded data sequence from the first segment and means for forming a second decoded data sequence from the second segment; and
means for outputting the first decoded data sequence and the second decoded data sequence to a display unit for rendering a three-dimensional graphics data by combining the first decoded data sequence and the second decoded data sequence.

Another advantage in accordance with an embodiment of the invention is that the provided decoder is arranged to decode both the graphics object and information relating to the graphics object by using only one processor.

According to a sixth aspect of the invention there is provided a set-top box comprising the decoder in accordance with the fifth aspect of the invention.

According to a seventh aspect of the invention there is provided a DVD player comprising the decoder in accordance with the fifth aspect of the invention.

According to an eighth aspect of the invention there is provided a digital television comprising the decoder in accordance with the fifth aspect of the invention.

Other features and advantages of the invention will become apparent from the following description of non-limiting exemplary embodiments, with reference to the appended drawings, in which:

FIGS. 4A and 4B are a flow chart depicting a method of decoding the data stream in accordance with an embodiment of the invention;

In the following description some non-limiting embodiments of the invention will be described in more detail in the context of Blu-ray graphics system with reference to the appended figures. However, it is to be noted that the invention is not restricted to this environment, but the teachings of the invention are equally applicable in other types of graphics systems as well.

In accordance with an embodiment of the invention a data stream is created that contains in this example two ODSs, one PCS, one WDS, one PDS and one END segment. In this case the data stream is created by the BD player 103. Now the first ODS contains in its object_data_fragment field a 2D graphics object and the second ODS contains in its object_data_fragment field a depth map for the 2D graphics object. It is to be noted that instead of the depth map, the second segment could equally contain audio information or other interactive information for the 2D graphics object. Also the order of these two ODSs is not limited and the first ODS could also contain the depth map and the second ODS could contain the graphics object. The PCS, WDS and PDS contain information for further defining the data contained in the ODSs. The END segment is used to indicate that the transmission of a display set is complete. The data stream consists of segments and the segments further form display sets. The END segment does not contain any segment data and it is not stored in any buffer of the decoder after the contents of the END segment has been decoded. The created graphics stream is then stored on the BD-ROM 101.

It is to be noted that the data stream may contain more than two ODSs and in that case for each ODS containing the 2D graphics object, there would be the corresponding ODS containing the depth map information. The number of ODSs in the data stream may not be dependent on the number of PCSs or WDSs.

In this example the data stream comprises a graphics object that can be overlaid as a subtitle on the associated video image. The data stream is thus a presentation graphics stream of a high definition movie (HDMV) mode of the Blu-ray standard. The HDMV mode also provides for an interactive graphics stream that contains information required to provide a series of interactive displays, which appear and disappear with frame accuracy, that are supplemental to an associated HDMV presentation. In the decoder, separate graphics planes are required for the objects of the presentation graphics stream and the objects of the interactive graphics stream. The graphics image is composited onto the graphics plane to form a graphics display before overlaying the graphics display on the associated video image. This procedure will be explained later in more detail.

Next the operation of the decoder is described with reference to the block diagrams of FIGS. 3 and 5 and the flow chart of FIGS. 4A and 4B.

Figure 3:
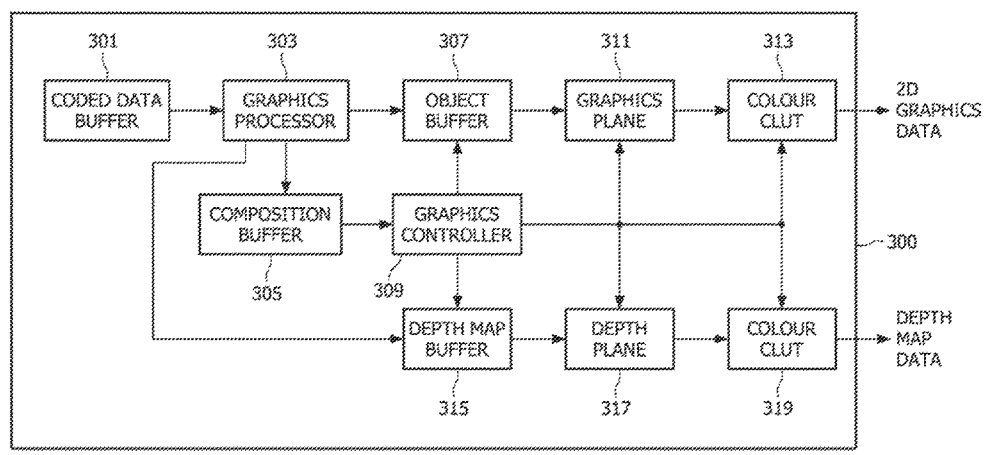
FIG. 3 is a block diagram of a decoder in accordance with an embodiment of the invention arranged to decode a data stream.

FIG. 3 illustrates a graphics decoder 300 in accordance with an embodiment of the invention, which is arranged to decode the information stored on the BD-ROM 101. The decoder 300 of FIG. 3, is physically located in the BD player 103.

Figure 1:
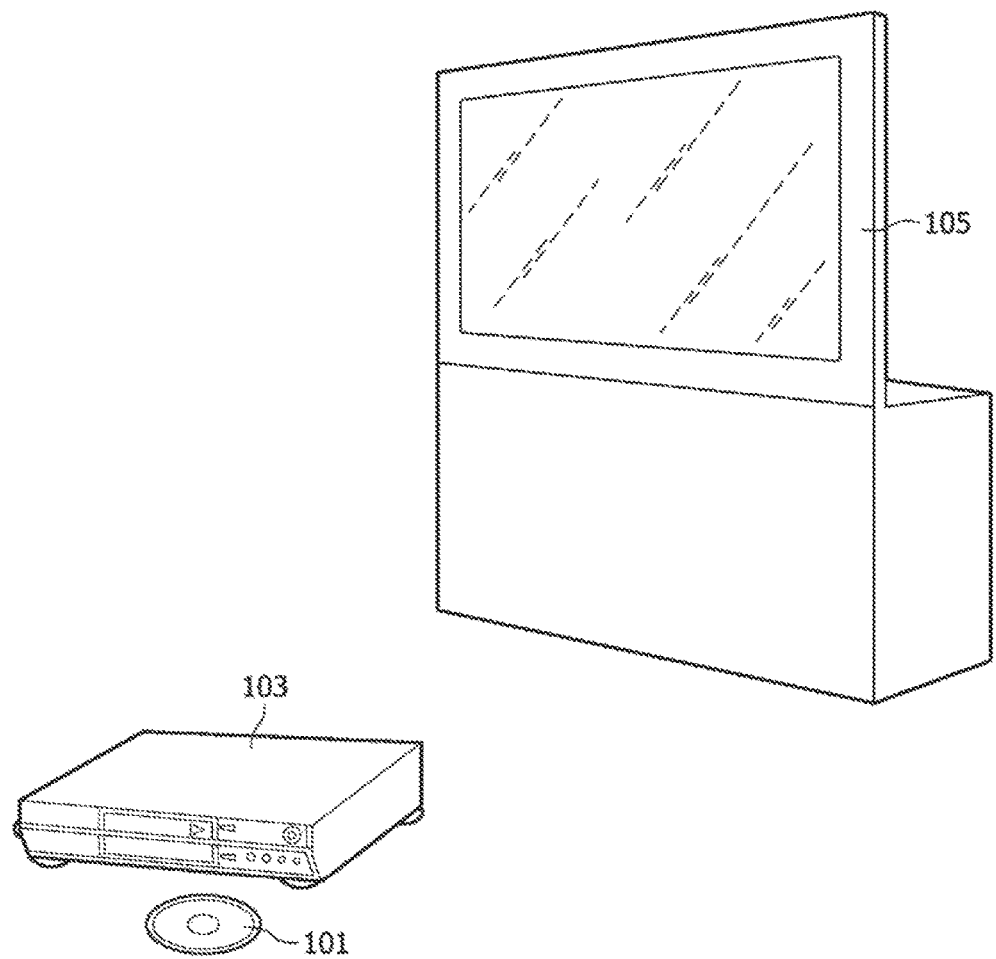
FIG. 1 shows an environment in which the embodiments of the invention may exist.
Figure 2:
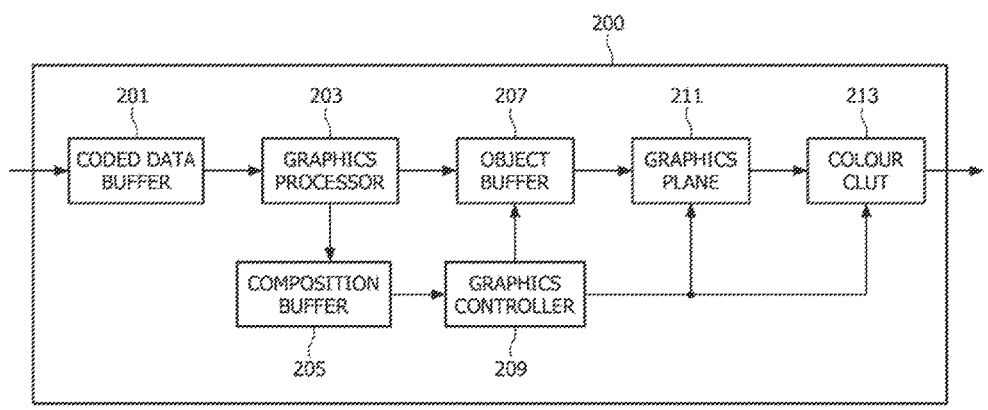
FIG. 2 is a block diagram of a decoder arranged to decode a graphics stream.

A coded data buffer 301, a composition buffer 305, an object buffer 307, a graphics plane 311 and a CLUT block 313 in FIG. 3 operate as the corresponding blocks of FIG. 2. However, the operation of a graphics processor 303 and a graphics controller 309 is different than in the solution of FIG. 2. There is also shown a depth plane 317 and a second CLUT block 319 which do not exist in the decoder of FIG. 2. The decoder 300 can be used to decode 2D or 3D data stream. In this case the decoder 103 is physically located in the BD player 103.

First in step 401 of FIG. 4A the information stored on the BD-ROM 101 is read into the coded data buffer 301. The data stream that arrives in the coded data buffer 301 consists of the following functional segments as described earlier: one PCS, one WDS, one PDS, two ODSs and one END. The order of the data segments in the data stream is not limited as long as the END segment is the last segment of the stream. Then the graphics processor 303 extracts, in step 403, the data segments from the coded data buffer 301 at the times defined by system time-stamps associated with the data segments. Next the graphics processor 303 recognizes, in step 405, different segment types from each other.

If the current segment is not the ODS, then in step 407 of FIG. 4A, the current segment is decoded into the composition buffer 305 of FIG. 3. Thus, the PCS, WDS and PDS are decoded by the graphics processor 303 to the composition buffer 305.

However, if in step 405 of FIG. 4A it was concluded that the current segment is the ODS, then in step 409, it is contemplated whether the current segment contains a depth map. If this is the case, then in step 411 of FIG. 4B, the depth map is decoded and transferred to the depth map buffer (DMB) 315. If on the other hand the ODS contains a 2D graphics object, then the 2D graphics object is decoded to obtain uncompressed graphics having index colors, and the graphics processor 303 then transfers, in step 413, the uncompressed graphics to the object buffer (OB) 307.

Then in step 415 of FIG. 4B, the data in the composition buffer 305 of FIG. 3 is transferred to the graphics controller 309. Then based on the information decoded from the PCS and WDS the graphics controller 309 instructs, in step 417, the object buffer 307 (OB) and the graphics plane 311 (GP) to form a graphics display on the graphics plane 311. Equally, the graphics controller 309 instructs the depth map buffer 315 (DMB) and the depth plane 317 (DP) to form a depth display on the depth plane 311. The information provided by the graphics controller 309 comprises, for instance, information related to cropping and positioning the graphics or depth display on the graphics or depth plane. International patent publication WO2005/006747 (U.S. Ser. No. 12/809,078) discloses further details how a graphics display can be obtained.

Next in step 419 of FIG. 4B, the depth display is composited on the depth plane 317 of FIG. 3 based on the information obtained from the graphics controller 309. Similarly in step 421 a graphics display is composited on the graphics plane 311. The decoder 300 implements a pipelined decoding model such that the graphics displays and the depth displays can be assembled on the graphics plane and on the depth plane, respectively while, at the same time, new graphics data and depth map data are decoded into the object buffer 307 and depth map buffer 317, respectively.

In step 423 of FIG. 4B the graphics controller 309 of FIG. 3 instructs the CLUT unit 313, 319 to perform color conversions. Then based on these instructions, in step 425, the depth display is transformed to full color and transparency in the CLUT unit 319 and in step 427, the graphics display is transformed to full color and transparency in the CLUT unit 313.

Then in step 429 of FIG. 4B the depth display from the CLUT unit 319 of FIG. 3 is transferred to the television 105 for overlaying the depth display on the associated 3D video image. Equally, in step 431 the graphics display from the CLUT unit 313 is transferred to the television 105 for overlaying the graphics display on the associated 3D video image. As a result, the two different data streams from the CLUT unit 313, 319 are output separately to the television 105 for overlaying a 3D subtitle onto a 3D video image. Then the decoding process may start again. When a new ODS arrives at the graphics processor 303, it is then decoded to the object buffer 307 or to the depth map buffer 315 and then a new display can be assembled on the graphics plane 311 or on the depth plane 317.

Figure 5:
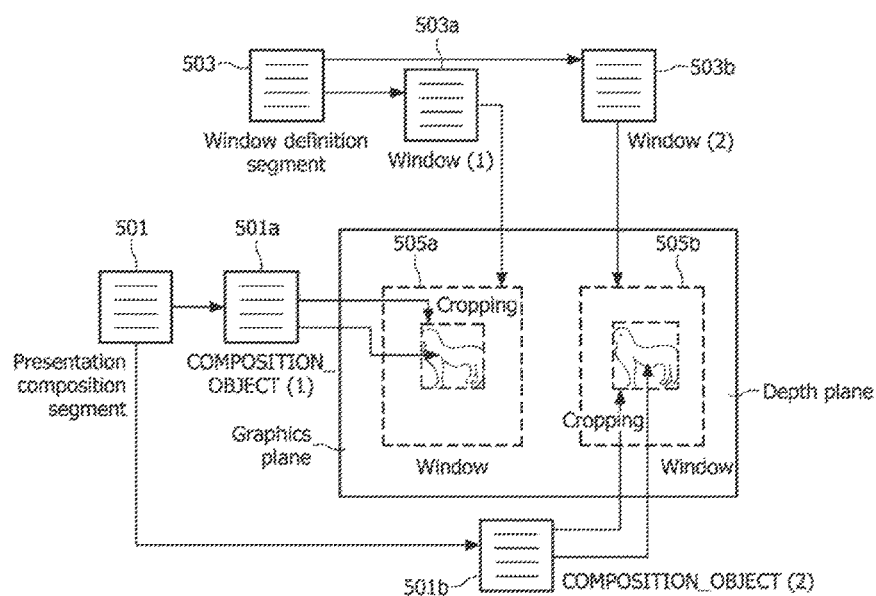
FIG. 5 is a block diagram illustrating a method of creating a graphics stream in accordance with an embodiment of the present invention.

FIG. 5 illustrates the data contained on the graphics plane 311 and on the depth plane 317. In FIG. 5, there is shown one PCS 501 comprising, in addition to other fields, two composition_object fields, namely a composition_object(1) 501a and a composition_object(2) 501b. The composition_object(1) 501a comprises information for cropping the graphics object and positioning the graphics object on the graphics plane 311. Equally, the composition_object(2) 501b comprises information for cropping the depth map and positioning the depth map on the depth plane 317.

In FIG. 5 there is also shown one WDS 503 defining two windows, namely a window(1) 503a and a window(2) 503b. In this case the window(1) 503a defines the window for the 2D graphics object and the window(2) 503b defines the window for the depth map information. The window(1) 503a and the window(2) 503b comprise information on how to define a rectangular area in a plane, known as a window 505a, 505b, on the graphics plane 311 or on the depth plane 317. In this case a rectangular window is defined by the window(1) 503a and the window(2) 503b. The window(1) 503a and the window(2) 503b define the vertical and horizontal positions of the windows 505a, 505b on the graphics and depth planes as well as the height and width of the windows 505a, 505b. In this case the windows 505a and 505b are of an equal size, but this does not have to be the case. If the windows 505a and 505b are defined to be of different size, then the larger window may contain some padding bits.

The invention equally relates to a computer program product (storage media) that is able to control computer means of the graphics system to implement any of the method steps of the embodiments of the invention when loaded and run on computer means of the graphics system.

The invention equally relates to an integrated circuit that is arranged to perform any of the method steps in accordance with the embodiments of the invention.

The invention equally relates to a recording media that is able to control computer means of the graphics system to implement any of the method steps of the embodiments of the invention when loaded and run on the computer means.

The invention equally relates to a set-top box that comprises the decoder 300.

The invention equally relates to a DVD player that comprises the decoder 300.

The invention equally relates to a digital television 105 that comprises the decoder 300.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used.

A computer program may be stored/distributed on a suitable medium supplied together with or as a part of other hardware, but may also be distributed in other forms, such as via the Internet or other wired or wireless telecommunication systems. Any reference signs in the claims should not be construed as limiting the scope of the invention.

The invention claimed is:

1. A method of operating video decoding system, the method comprising:

in a video decoding system:
  receiving in a receiver,
    a graphics data stream comprising one or more display sets, each display set comprising a plurality of functional segments, at least one display set comprising one PCS (presentation composition segment), a first and second graphics data segments being respective first and second ODSs (object definition segments) each with an object_ID field, and an object_data_fragment field, the object_data_fragment field of the first ODS containing the encoded 2 D graphics object and the object_data_fragment field of the second ODS containing encoded further information including the encoded 3 D graphics information;
    at least one WDS (window definition segment);
    at least one PDS (palette definition segment); and
    one END (end of display segment), the segments being in any order except the END is last, the PCS, WDS and PDS containing information for further defining the data contained in the ODSs, the encoded 3 D graphics information comprising an encoded depth map, the receiver storing the graphics data stream in a coded data buffer;
  a graphics processor:
    selecting functional segments from the coded data buffer according to time stamps associated with the functional segments;
    determining the functional type of a functional segment that is currently accessed;
    when the current functional segment is a PCS, WDS or PDS, decoding the current functional segment and storing the decoded data in a composition buffer;
    when the current functional segment is an ODSs, determining if the ODSs segment contains an encoded depth map or an encoded 2 D graphics object,
    when the ODS is determined to contain an encoded depth map, decoding the depth map and storing the uncompressed/decoded depth map in a depth map buffer; and
    when the ODS is determined to contain an encoded 2 D graphics object, decoding the 2 D graphics object, to obtain an uncompressed/decoded 2 D graphics object having index colors, and storing the uncompressed/decoded 2 D graphics object in an object buffer; and
  a graphics controller:
    receiving the data stored in the composition buffer,
    providing instructions and information to the object buffer and a graphics plane unit to form a graphics display on a graphics plane, the graphics display on the graphics plane constituting a first decoded data sequence, the information provided by the graphics controller comprising:
    information related to cropping and positioning the graphics display on the graphics plane in accordance with a description previously decoded from the PCS stored in the composition buffer;
    compositing the graphics display onto the graphics plane inside a bounding rectangular area of the graphics plane (window) (first decoded data sequence), the compositing being in accordance with the description previously decoded from the PCS that was stored in the composition buffer;
    providing instructions and information to the depth map buffer and a depth plane unit to form a depth display on a depth plane, the depth display on the depth plane constituting a second decoded data sequence, the information provided by the graphics controller comprising information related to cropping and positioning the depth display on the depth plane in accordance with the description previously decoded from the PCS that was previously stored in the composition buffer;
    compositing the depth display onto the depth plane (second decoded data sequence) inside a bounding rectangular area of the depth plane (window), the compositing being in accordance with the description previously decoded from the PCS that was previously stored in the composition buffer;
    based on data decoded from the PDS that was previously stored in the composition buffer, providing information and instructions to a first CLUT (color look-up table) unit to perform a color conversion of the graphics display, and the graphics display (second decoded data sequence) is transformed to full color and transparency in the CLUT unit; and
    based on data decoded from the PDS that was previously stored in the composition buffer providing information and instructions to a second CLUT unit to perform a color conversion of the depth display, and the depth display (second decoded data sequence) is transformed to full color and transparency in the second CLUT unit; and
    the data buffer and the graphics plane unit together forming a graphics display on a graphics plane (first decoded data sequence) while simultaneously the data buffer and a depth plane unit together forming a depth display on a depth plane (second decoded data sequence), whereby a pipelined decoder performing simultaneous parallel operations is provided;

the graphics display on the graphics plane (first decoded data sequence) and the depth display on the depth plane (second decoded data sequence) are each separately transferred from the CLUT unit to a 3 D video display unit, the decoded 3 D video image is also separately transferred to the 3 D video display unit, and the decoded 3 D video image is rendered on a display screen of the 3 D video display unit, and while the 3 D video image is rendered on the 3 D video display unit, the graphics display on the graphics plane (first decoded data sequence) and the depth display on the depth plane (second decoded data sequence) are combined and rendered by the 3 D display unit on the display screen of the 3 D video display unit so that the graphics display on the graphics plane (first decoded data sequence) and the depth display on the depth plane (second decoded data sequence) combine to form a 3 D graphics image that overlays at least part of the 3 D video image.

2. A method of operating a 3 D (three dimensional) video decoder to display a graphics image overlaying a 3 D video image, the method comprising:

in a 3 D video decoder:
receiving from a video decoding unit of the decoder a 3 D video object;
receiving from a graphics decoding unit of the decoder, a graphics display on a graphics plane, and a separate depth display on a depth plane,
receiving control information from the decoder, the control information comprising:
one PCS (presentation composition segment), at least one WDS (window definition segment), at least one PDS (palette definition segment), and one END (end of display set), wherein the segments are in any order except the END is last, wherein
the one PCS comprising two composition object fields, a first composition object field comprising control information for controlling an appearance of the encoded 2 D graphics object (graphics display) on a graphics plane and a second composition object field comprising control information configured to control an appearance of the encoded depth map (depth display) on a depth plane;
the at least one WDS controlling a decoder to control the position and dimensions of a window for the encoded 2 D graphics object (graphics display) in the graphics plane, and a position and dimension of a window for the encoded depth map (depth display) on the depth plane; and
the at least one PDS defining a palette used for color conversion of the encoded 2 D graphics object (graphics display) on the graphics plane and defining a palette used for color conversion of the encoded depth map (depth display) on the depth plane;
combining the graphics display on the graphics plane with the depth display on the depth plane to form a combined graphics object according to the control information;

rendering on a display screen a 3 D video image from the 3 D video object and a 3 D graphics image from the combined graphics object, the 3 D graphics image overlaying at least part of the 3 D video image according to the control information.

3. A 3 D (three dimensional) optical disc encoded with user data and control data to control the operation of a decoder, the 3 D optical disc comprising:

an encoded data stream comprising:
an encoded video data stream, and an encoded graphics data stream, the encoded video stream comprising an encoded 3 D video object, and the encoded graphics data stream comprising one or more display sets, each display set comprising a plurality of functional segments, and at least one display set comprising:
at least two ODSs (object definition sets) each with an object_ID field and an object_data_fragment field, and the at least two ODSs including first and second ODSs with respective first and second object_data_fragment fields, the first object_data_fragment field containing an encoded 2 D graphics object and the second object_data_fragment field containing encoded further information related to the 2 D graphics object, the further information including an encoded depth map object for the encoded 2 D graphics object; and
other functional segments comprising:
one PCS (presentation composition segment), at least one WDS (window definition segment), at least one PDS (palette definition segment), and one END (end of display set), to control the decoding of the ODSs or the display of the decoded 2 D graphics object or the depth map object, wherein the segments are in any order except the END is last, wherein
the one PCS comprising two object fields, a first composition object fields comprising control information for controlling an appearance of the encoded 2 D graphics object (graphics display) on a graphics plane and a second composition object field comprising control information configured to control an appearance of the encoded depth map (depth display) on a depth plane;
the at least one WDS controlling the decoder to control the position and dimensions of a window for the encoded 2 graphics object (graphics display) in the graphics plane, and a position and dimensions of a window for the encoded depth map (depth display) on the depth; and
the at least one PDS defining an palette used for color conversion of the encoded 2 D graphics object (graphics display) on the graphics plane and defining a palette used for color conversion of the encoded depth map (depth display)on the depth plane.

4. The 3 D optical disc of claim 3, wherein the encoded data stream complies with the requirements of the Blu-ray disc standard.

5. A computer readable storage media that is not a transitive propagating signal or wave, and comprising control information for operating a 3 D (three-dimensional) video system to perform a method for creating an encoded data stream when the control information comprising:

one PCS (presentation composition segment), at least one WDS (window definition segment), at least one PDS (palette definition segment), and one END (end of display set) is loaded and runs on the 3 D video system, wherein the segments are in any order except the END is last, wherein the one PCS comprising two composition object fields, a first composition object field comprising control information for controlling an appearance of the encoded 2 D graphics object (graphics display) on a graphics plane and a second composition object field comprising control information configured to control an appearance of the encoded depth map (depth display) on a depth plane;

the at least one WDS controlling a decoder to control the position and dimensions of a window for the encoded 2 D graphics object (graphics display) in the graphics plane, and a position and dimensions of a window for the encoded depth map (depth display) on the depth plane; and the at least one PDS defining a palette used for color conversion of the encoded 2 D graphics object (graphics display) on the graphics plane and defining a palette used for color conversion of the encoded depth map (depth display) on the depth plane, the method comprising:

in a 3 D video system:
  receiving in a receiver:
    a 3 D video object and a 2 D (two dimensional) graphics object and further information related to the 2 D graphics object, the further information including 3 D graphics information, the 3 D graphics information being configured to be decoded by a graphics decoder and combined with a decoded 2 D graphics image decoded from the encoded 2 D graphics object, and the combination rendered on a display screen of a video display unit as a 3 D graphics image overlaying a decoded at least part of 3 D video image decoded from the encoded 3 D video object;
  encoding in a first decoder, the 3 D video object into an encoded 3 D video object and forming an encoded video data stream containing the encoded 3 D video object;
  encoding in a second decoder, the 2 D graphics object into an encoded 2 D graphics object, and forming a first graphics data segment containing the encoded 2 D data object, and encoding at least a portion of the further information including the 3 D graphics information into encoded further information including encoded 3 D graphics information, and forming an encoded second graphics data segment containing the encoded further information including the encoded 3 D graphics information, and forming an encoded graphics data stream containing the first graphics data segment and the second graphics data segment;
  forming an encoded data stream comprising the encoded video data stream and the encoded graphics data stream, the encoded video stream comprising the encoded 3 D video object, and the encoded graphics data stream comprising the first encoded graphical data segment and a second encoded graphics data segment, the first encoded graphics segment comprising the encoded 2 D graphics object, and the second encoded graphics segment comprising encoded further information related to the 2 D graphics object, the further information including the encoded 3 D graphics information, and
  wherein the encoded 3 D video object is configured to be decoded by a video decoder to provide a decoded 3 D video object which is configured to be rendered by a 3 D video display unit to form a 3 D video image on a display screen, and
  wherein the first and second encoded graphics data segments are configured to be decoded by a graphics decoder to provide a first decoded graphics data sequence and a second decoded graphics data sequence respectively, which first and second decoded graphics data sequences are configured to be combined and rendered by the 3 D video display unit to form a 3 D graphics image overlaying at least part of the 3 D video image on the display screen.

6. A computer readable media that is not a transitory propagating signal or wave comprising control information for operating a 3 D (three-dimensional) video system, to perform a method for displaying a 3 D graphical image overlaying a 3 D video image, when the control information one PCS (presentation composition segment), at least one WDS (window definition segment), at least one PDS (palette definition segment), and one END (end of display set), wherein the segments are in any order except the END is last, wherein the one PCS comprising two composition object fields, a first composition object field comprising control information for controlling an appearance of the encoded 2D graphics object (graphics display) on a graphics plane and a second composition object field comprising control information configured to control an appearance of the encoded depth map (depth display) on a depth plane;

the at least one WDS controlling a decoder to control the position and dimensions of a window for the encode 2D graphics object (graphics display) in the graphics plane, and a position and dimensions of a window for the encoded depth map (depth display) on the depth plane; and the at least one PDS defining a palette used for color conversion of the encoded 2D graphics object (graphics display) on the graphics plane and defining a palette used for color conversion of the encoded depth map (depth display) on the depth plane, is loaded and runs on the 3D video system, the method comprising:

in a 3 D video system:
  receiving in a receiver, from a video decoding unit of a decoder, a 3 D video object;
  receiving in a receiver, from a graphics decoding unit of the decoder, a graphics display on a graphics plane, and a separate depth display on a depth plane, the graphics display on the graphics plane and depth display on the depth plane comprising control data,
  combining the graphics display on the graphics plane with the depth display on the depth plane to form a combined graphics object according to the control data;
  simultaneously rendering, on a display screen, a 3 D video image from the 3 D video object and a 3 D graphics image from the combined graphics object, the 3 D graphics image overlaying at least part of the 3 D video image according to the control data.

7. A 3 D (three dimensional) video system for decoding an encoded data stream, comprising:
  a receiver configured to receive an encoded data stream comprising an encoded video data stream and an encoded graphics data stream, the encoded video data stream comprising an encoded video object, the encoded graphics data stream comprising at least first and second encoded graphics data segments, the first encoded graphics data segment comprising an encoded 2 D graphics object and the second encoded graphical data segment comprising encoded further information related to the encoded 2 D graphics object, the encoded further information including encoded 3 D graphical information comprising:

one PCS (presentation composition segment), at least one WDS (window definition segment), at least one PDS (palette definition segment), and one END (end of display set), wherein the segments are in any order except the END is last, wherein the one PCS comprising two composition object fields, a first composition object field comprising control information for controlling an appearance of the encoded 2D graphics object (graphics display) on a graphics plane and a second composition object field comprising control information configured to control an appearance of the encoded depth map (depth display) on a depth plane;

the at least one WDS controlling a decoder to control the position and dimensions of a window for the encoded 2D graphics object (graphics display) in the graphics plane, and a position and dimensions of a window for the encoded depth map (depth display) on the depth plane; and the at least one PDS defining a palette used for color conversion of the encoded 2D graphics object (graphics display) on the graphics plane and defining a palette used for color conversion of the encoded depth map (depth display) on the depth plane;

a video decoder configured to decode the encoded video data stream to obtain the encoded 3 D video image and to decode the 3 D video image to obtain a decoded 3 D video image;

a graphical decoder configured to decode the encoded graphics data stream, the receiver storing the encoded graphical data from the encoded graphical data stream into a coded data buffer, the graphical decoder comprising:

a processor configured to:
access the coded data buffer for forming a first decoded graphical data sequence from the first encoded graphical data segment and for forming a second decoded graphical data sequence from the second encoded graphical data segment; and
output the decoded 3D video image, the first decoded graphical data sequence, and the second decoded graphical data sequence; and a 3 D video display unit, wherein the first and second graphical data sequences are configured to control the 3 D video display unit to be combined into a combined graphical object and rendered by the 3 D display unit as a 3 D graphics image overlaying the 3D video image.

8. A media recording system comprising the 3 D video system of claim 7.

9. A set-top box comprising the 3 D video system of claim 7.

10. A media player comprising the 3 D video system of claim 7.

11. A digital television comprising the 3 D video system of claim 7.

12. A computer readable storage media that is not a propagating signal or wave, and comprising control information for operating a 3 D (three-dimensional) video decoding system, to perform a method for displaying a 3 D graphical image overlaying a 3 D video image, when the control information is loaded and runs on the 3 D video system, the method comprising:

in a 3 D video system:
receiving in a receiver from a decoder, a 3 D video object, and receiving from the decoder, a graphics display on a graphics plane, and a separate depth display on the depth plane, the graphics display on the graphics plane, and a separate depth display on the depth plane comprising control data comprising:

one PCS (presentation composition segment) at least one WDS (window definition segment) at least one PDS (palette definition segment) and one END (end of display set) wherein the segments are in any order except the END is last wherein the one PCS comprising two composition object fields, a first composition object field comprising control information for controlling an appearance of the encoded 2D graphics object (graphics display) on a graphics plane and a second appearance of the encoded depth map (depth display) on a depth plane;

the at least one WDS controlling a decoder to control the position and dimensions of a window for the encoded 2D graphics object (graphics display) in the graphics plane, and a position and dimensions of a window for the encoded depth map (depth display) on the depth plane; and the at least one PDS defining a palette used for color conversion of the encoded 2D graphics object (graphics display) on the graphics plane and defining a palette used for color conversion of the encoded depth map (depth display) on the depth plane; and combining by a processor the graphics display on the graphics plane with the depth display on the depth plane to form a 3 D graphics object according to the control data; and:

rendering on a display screen of a 3 D display unit, a 3 D video image derived from the 3 D video object simultaneously with a 3 D graphics image derived from the 3 D graphics object, the 3 D graphics image overlaying at least part of the 3 D video image according to the control data.

13. A 3 D (three dimensional) video system for displaying a 3 D graphical image overlaying a 3 D video image, comprising:

a receiver configured to receive from a video decoding unit of a decoder a 3 D video object, and to receive from a decoding unit of the decoder, a graphics display on the graphics plane, and a separate depth display on the depth plane, the graphics display on the graphics plane, and a separate depth display on the depth plane comprising control data comprising:

one PCS (presentation composition segment), at least one WDS (window definition segment), at least one PDS (palette definition segment), and one END (end of display set), wherein the segments are in any order except the END is last, wherein the one PCS comprising two composition object fields, a first composition object field comprising control information for controlling an appearance of the encoded 2D graphics object (graphics display) on a graphics plane and a second composition object field comprising control information configured to control an appearance of the encoded depth map (depth display) on a depth plane;

the at least one WDS controlling a decoder to control the position and dimensions of a window for the encoded 2D graphics object (graphics display) in the graphics plane, and a position and dimensions of a window for the encoded depth map (depth display) on the depth plane; and the at least one PDS defining a palette used for color conversion of the encoded 2D graphics object (graphics display) on the graphics plane and defining a palette used for color conversion of the encoded depth map (depth display) on the depth plane;

a display screen to display images;

a processor configured to combine the graphics display on the graphics plane with the depth display on the depth plane to form a 3 D graphics object according to the control data; and to simultaneously render on the display screen a 3 D video image from the 3 D video object and a 3 D graphics image from the 3 D graphics object, the 3 D graphics image overlaying at least part of the 3 D video image according to the control data.

* * * * *